United States Patent [19]
Martin et al.

[11] Patent Number: 5,554,897
[45] Date of Patent: Sep. 10, 1996

[54] DOWNHOLD MOTOR COOLING AND PROTECTION SYSTEM

[75] Inventors: Fred S. Martin; John L. Bearden, both of Claremore, Okla.

[73] Assignee: Baker Hughes Incorporated, Houston, Tex.

[21] Appl. No.: 231,542

[22] Filed: Apr. 22, 1994

[51] Int. Cl.$^6$ .............. H02K 9/19; H02K 9/00; H02K 5/12; F04B 17/03
[52] U.S. Cl. .............. 310/54; 310/87; 417/423.8
[58] Field of Search .............. 310/54, 87, 88, 310/157; 417/366, 367, 368, 414, 423.3, 423.8, 423.11, 423.14

[56] References Cited

U.S. PATENT DOCUMENTS

| | | | |
|---|---|---|---|
| 2,321,126 | 6/1943 | Breuer | 310/57 |
| 2,404,783 | 7/1946 | Blom | 310/87 |
| 2,545,422 | 3/1951 | Blom | 310/87 |
| 2,951,165 | 8/1960 | Arutunoff | 310/54 |
| 3,123,730 | 3/1964 | Fagel | 310/54 |
| 3,653,785 | 4/1972 | Dahlgren et al. | 310/54 |
| 3,842,298 | 10/1974 | Schaefer | 310/87 |
| 4,126,406 | 11/1978 | Traylor et al. | 417/373 |
| 4,436,488 | 3/1984 | Witten | 310/87 |
| 4,932,848 | 6/1990 | Christensen | 417/414 |
| 5,038,853 | 8/1991 | Callaway, Sr. et al. | 165/46 |
| 5,087,846 | 2/1992 | Wright | 310/87 |

FOREIGN PATENT DOCUMENTS

| | | | |
|---|---|---|---|
| 0178087 | 4/1986 | European Pat. Off. | F04D 29/58 |
| 1096478 | 12/1967 | United Kingdom | H02K 5/04 |
| 9501891 | 6/1995 | United Kingdom . | |

OTHER PUBLICATIONS

"Earth Temperatures," M. McCray and F. Cole, Oil Well Drilling Technology, 1981, pp. 53–60.
"Drawing Heat from Sewage," Chemical Week, Technology Newsletter, Nov. 7, 1984, p. 38.
"Europe Warms to Biogas," Ken Fouhy, Chemical Week, Section: Newsfront, May 1993, vol. 100, No. 5, p. 45.
"A Safer, Longer–Lasting Antioxidant?", B. J. Spalding, Jan. 6–13, 1988, Section: Technology, Chemical Week.

*Primary Examiner*—Clayton E. LaBalle
*Attorney, Agent, or Firm*—James E. Bradley; Max Ciccarelli

[57] ABSTRACT

The motor cooling and protection system has a shroud concentrically disposed about a motor housing of a downhole motor. The shroud is sealed from well fluids in the well and defines and annular chamber between the motor housing and the shroud. A longitudinal annular baffle is located in the chamber and partitions the chamber into two annular and concentric sub-chambers. The two sub-chambers have axially spaced apart communication openings such that the two sub-chambers are in fluid communication with each other. A cooling fluid having high conductive heat transfer rates is located in the chamber for circulating between the two sub-chambers, through the communication openings, to facilitate and enhance the transfer of heat between the motor and the well fluids.

19 Claims, 2 Drawing Sheets

5,554,897

DOWNHOLD MOTOR COOLING AND PROTECTION SYSTEM

BACKGROUND OF THE INVENTION

1. Field of the Invention

This invention relates in general to downhole well pump motors and in particular to systems for cooling and protecting downhole motors for pumps or compressors in petroleum production wells.

2. Description of the Prior Art

Generally, well pump motors for downhole use are surrounded by a sealed motor housing that is filled with a fluid that helps to cool the motor components and that helps to prevent exterior fluids from entering the motor housing. In some applications, however, the heat dissipation away from the motor housing is not sufficient to prevent overheating of the motor. For such applications, improved cooling systems are required.

Electrical motors for surface application have used vanes or ribs extending from the motor housing to increase the heat transfer surface area, thus providing enhanced cooling. Oil and gas wells however, are fairly small in diameter and thus lack space for large fins. U.S. Pat. No. 4,126,406 shows a system for a downhole well pump motor which uses a surface pump to pump water, or other cooling fluid, down an insulated tubing to a shroud located around the motor housing and up a return tubing to a cooling system at the surface. Such a system requires a surface pump, heat exchanger, and additional tubing, adding considerably to the cost.

SUMMARY OF THE INVENTION

It is the general object of the invention to provide a system for cooling and protecting a downhole motor that is simple, that effectively cools and protects the motor, and that is cost effective.

The motor cooling and/or protection system has a shroud concentrically disposed about a motor housing of a downhole motor. The shroud is sealed from well fluids in the well and defines an annular chamber between the motor housing and the shroud. A longitudinal annular baffle is located in the chamber and partitions the chamber into two annular and concentric sub-chambers. The two sub-chambers have axially spaced apart communication openings such that the two sub-chambers are in fluid communication with each other. A chamber fluid is located in the chamber for circulating between the two sub-chambers, through the communication openings, to facilitate and enhance the transfer of heat between the motor and the well fluids outside the shroud. In the preferred embodiment, the chamber fluid has a high heat transfer coefficient, preferably higher than that of the well bore fluid.

The above as well as additional objects, features, and advantages will become apparent in the following description.

DETAILED DESCRIPTION OF THE INVENTION

Figure 1:
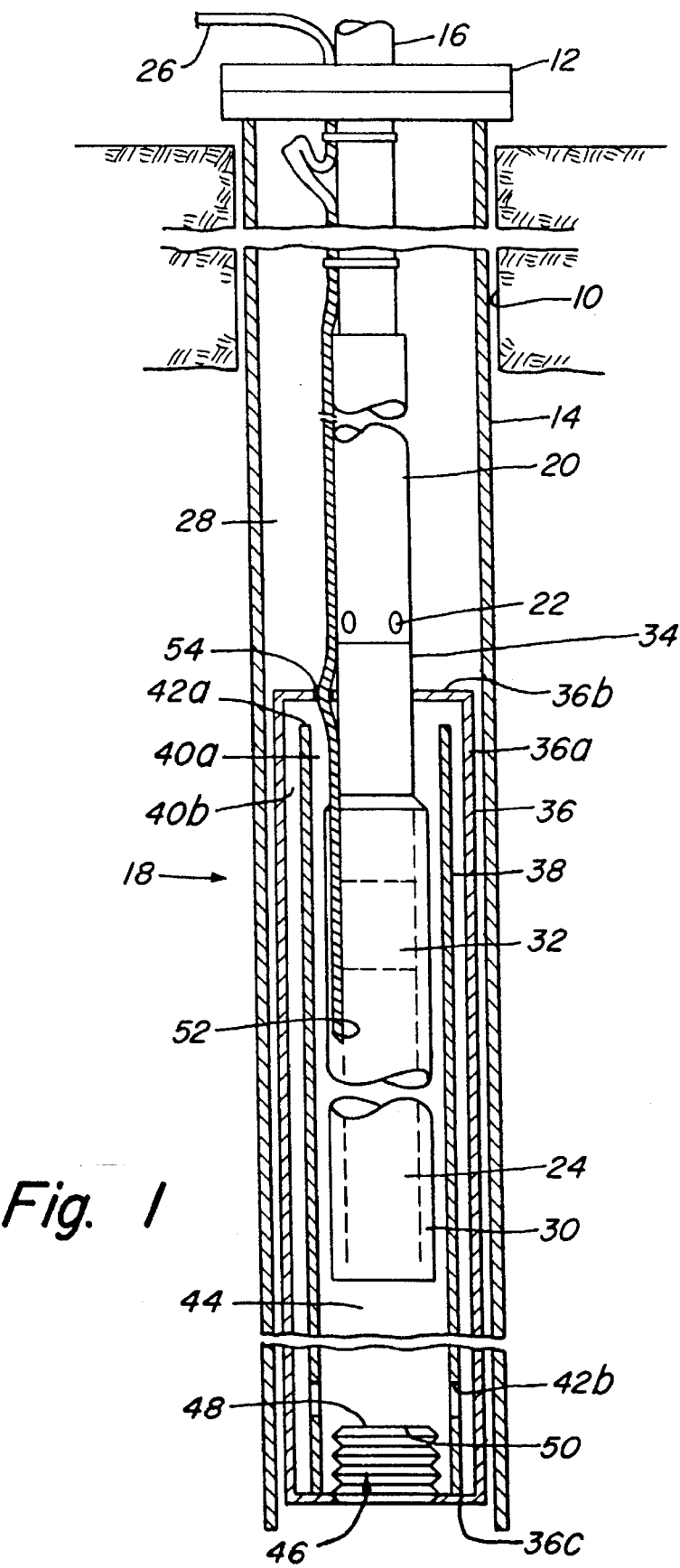
FIG. 1 is a vertical cross-sectional view illustrating the motor cooling and protection system of this invention.

FIG. 1 illustrates an embodiment of the present invention. Wellbore 10 is a wellbore drilled into the earth's surface. At the top of wellbore 10 is wellhead 12, and extending into wellbore 10 is casing 14. Tubing 16 extends downward into casing 14. At the bottom of tubing 16 is a downhole assembly 18. Downhole assembly 18 includes a submersible turbine machine 20 having intake ports 22 and being driven by an electric motor 24. Electric motor 24 is powered by power cable 26 which extends from the surface, along tubing 16, and down to downhole assembly 18. The turbine machine 20 could be any type of turbine machine, such a pump or compressor that could be used for various purposes such as pumping or pressurizing downhole well fluid 28 for delivery to the surface. Well fluid 28 can be either oil, gas, or other fluid found in wellbore 10.

Motor 24 can be any conventional motor suitable for driving turbine machine 20. Motor 24 has a motor housing 30. A shaft (not shown) couples motor 24 to turbine machine 20. Between motor 24 and turbine machine 20 are located a seal section 32 and a transition member 34. Seal sections are well known in the art and are used to prevent well fluids from entering the motor and to equalize the pressure inside seal section 32 and motor 24 to the pressure outside seal section 32 and motor 24. The various seals, pressure equalizers, and other components of seal section 32 are not shown since they are well known in the art.

Still referring to FIG. 1, shroud 36 is concentrically disposed about motor 24 and seal section 32. Shroud 36 has a cylindrical wall 36a, a top portion 36b, and a bottom portion 36c. Top portion 36b is sealingly connected to cylindrical wall 36a and to transition member 34; bottom portion 36c is sealingly connected to cylindrical wall 36a and to pressure equalizer 46 (which is discussed in more detail below). Shroud 36 forms a sealed, annular chamber between motor housing 30 and shroud 36. Since top portion 36b of shroud 36 is attached to transition member 34, and since bottom portion 36c of shroud 36 is located below motor housing 30, shroud 36 completely surrounds both motor housing 30 and seal section 32.

The preferred embodiment shows an annular chamber between motor housing 30 and shroud 36 that is cylindrical in shape and oriented axially with respect to motor housing 30. However, the annular chamber could be designed differently; for example, it can be made to spiral along the axis of motor housing 30.

Inside the annular chamber formed between motor housing 30 and shroud 36 is a cylindrical baffle 38 attached to bottom portion 36c of shroud 36. Baffle 38 partitions the annular chamber between motor housing 30 and shroud 36 into inner annular sub-chamber 40a and outer annular sub-chamber 40b.

There are two communication openings 42 between inner and outer sub-chambers 40a and 40b. Upper communication opening 42a is a gap between the top of baffle 38 and the upper portion 36b of shroud 36. Lower communication opening 42b consists of a plurality of ports near the bottom of baffle 38. Communication openings 42 allow fluid 44 to circulate between sub-chambers 40a and 40b. Fluid 44 is a fluid having high conductive heat transfer coefficients to enhance heat transfer through fluid 44. In environments were cooling is not of great importance, the chamber fluid 44 can be selected more on the basis of its protecting qualities than on the basis of high heat transfer coefficients.

Still referring to FIG. 1, at the bottom of shroud 36 is pressure equalizer 46. Pressure equalizer 46 is shown in this embodiment as a volumetric change bellows 46. Bellows 46 comprises an expandable member having an upper side 48 in contact with the cooling fluid 44 and a lower side 50 in contact with well fluid 28. As the pressure in wellbore 10 changes, bellows 46 expands or contracts to allow the pressure inside to equalize with pressure outside shroud 36.

Cable 26 that powers motor 24 is routed along tubing 16, along transition member 34, and along seal section 32, to pot-head 52 where it enters motor housing 30. To maintain the integrity of the sealed chamber formed by shroud 36, a penetrator 54 is used to form a seal at the intersection of cable 26 and upper portion 36b of shroud 36.

In operation, the above motor cooling and protective system functions as follows. Downhole assembly 18 is lowered into wellbore 10 by lowering tubing 16 into casing 14. Electrical power is passed through cable 26 to activate motor 24 which in turn mechanically powers turbine machine 20. Motor 24 generates heat during operation. The heat generated by motor 24 raises the temperature of motor housing 30. The elevated temperature of motor housing 30 heats up the cooling fluid 44 located in inner sub-chamber 40a and causes that portion of the cooling fluid 44 to rise in temperature. As the temperature of that portion of cooling fluid 44 begins to rise, the fluid becomes more buoyant and begins to rise towards the upper portion of inner sub-chamber 40a. When it reaches upper communication opening 42a, the fluid will contact cylindrical wall 36a of shroud 36 and will transfer heat to wall 36a. This transfer of heat causes the temperature of that cooling fluid 44 to drop, cooling fluid 44 becomes less buoyant, and begins to drop down outer sub-chamber 40b. When cooling fluid 44 reaches lower communication port 42b, its close proximity to motor housing 30 causes its temperature to rise again, and cooling fluid 44 again rises upward through inner sub-chamber 40a and repeats the cycle. This convection cooling cycle enhances heat dissipation from motor 24.

As described above, in the embodiment of FIG. 1 shroud 36 surrounds both motor 24 and seal section 32. Therefore, both motor housing 30 and seal section 32 are isolated from well fluids 28, and are instead exposed to cooling or chamber fluid 44. In some downhole operations, well fluid 28 is very corrosive and can damage seal section 32 and motor 24. However, by having seal section 32 and motor housing 30 surrounded by clean cooling or chamber fluid 44, seal section 32 will equalize to a clean, controlled fluid, thus increasing its life.

In very high pressure wells, however, the embodiment of FIG. 1 might need to be modified. Since shroud 36 extends above pot-head 52, penetrator 54 must be used at the location where cable 26 enters shroud 36. Extreme pressures may cause penetrator 54 to fail. Therefore, when using the invention in high pressure wells, it may be advisable to have upper portion 36b of shroud 36 extend only to just below pot-head 52. Although such a configuration would provide less protection to seal section 32, it would ensure the integrity of the sealed chamber inside shroud 36. However, by reducing the length of shroud 36, the cooling capacity of shroud 36 is also reduced. Thus, a balance must be struck depending on the corrosiveness of well fluid 28 and the amount of cooling needed.

Figure 2:
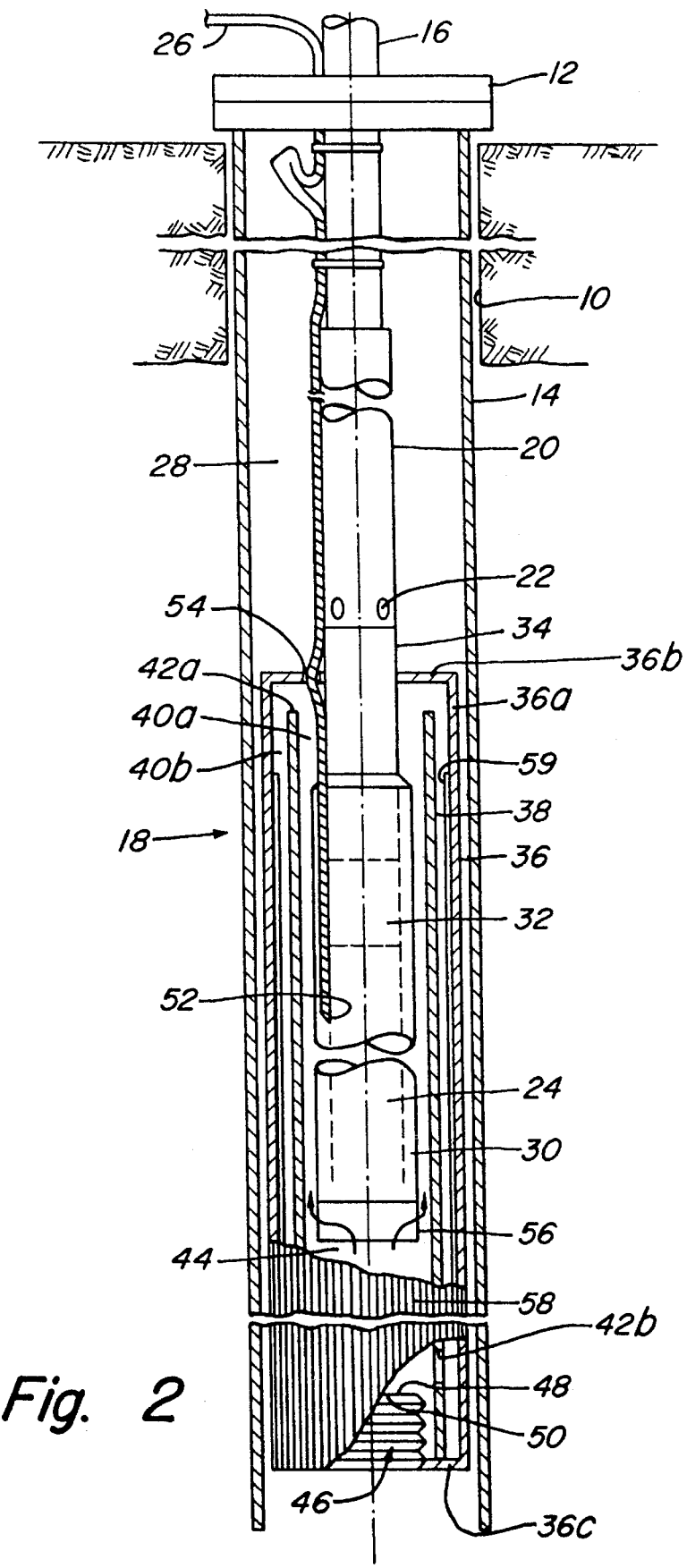
FIG. 2 is a partial vertical cross-sectional view illustrating another embodiment of the motor cooling and protection system of this invention.

FIG. 2 illustrates another embodiment of the motor cooling and protection system of the present invention. The embodiment of FIG. 2, like the embodiment of FIG. 1, has turbine machine 20, seal section 32, motor 24, shroud 36, and baffle 38. However, the embodiment of FIG. 2 additionally has a flow inducer 56 and vanes or ribs 58.

Flow inducer or impeller 56 is located within shroud 36 and is mounted below motor 24. Flow inducer 56 is mechanically coupled to motor 24. The rotation of the shaft of motor 24 drives flow inducer 56. Flow inducer 56 enhances fluid flow upward through inner sub-chamber 40a and downward through outer sub-chamber 40b. The increased flow rate between inner and outer sub-chambers 40a and 40b increases the heat transfer from motor housing 30 to well fluid 28.

The embodiment of FIG. 2 also includes vanes or ribs 58 that extend from the exterior of shroud 36. Vanes 58 increase the heat transfer surface area, thus providing enhanced cooling. Additional vanes on other heat transfer surfaces could also be used to further enhance heat transfer as, for example, vanes 59 extending from an interior surface of shroud 36.

The motor cooling and protection system of the present invention provides a way of cooling and protecting a downhole motor with equipment that is self-contained, uncomplicated, inexpensive, and very efficient.

While the invention has been particularly shown and described with reference to a preferred embodiment, it will be understood by those skilled in the art that various changes in form and detail may be made therein without departing from the spirit and scope of the invention.

What is claimed is:

1. A cooling apparatus for cooling and protecting a submersible electric motor used in a well, the cooling apparatus comprising:

a shroud concentrically disposed around a motor housing of the motor, the shroud being sealed from well fluids in the well and defining an annular chamber between the motor housing and the shroud;

a longitudinal annular baffle that partitions the chamber into two concentric annular sub-chambers;

the sub-chambers having axially spaced apart communication openings such that the two sub-chambers are in fluid communication with each other;

a chamber fluid located in the chamber for circulating between the two sub-chambers through the communication openings to facilitate the transfer of heat between the motor and the well fluids outside the shroud; and the chamber fluid being isolated from communication with an exterior of the shroud.

2. The cooling apparatus according to claim 1 further comprising a pressure equalizer mounted to the shroud, the pressure equalizer having one side exposed to the chamber fluid and another side to the well fluid and being movable for equalizing pressures inside to that outside the shroud.

3. The cooling apparatus according to claim 1 wherein one of the communication openings is at the upper end of the baffle and another of the communication openings is at the lower end of the baffle.

4. The cooling apparatus according to claim 1 further comprising a rotatably driven flow inducer mounted within the chamber for enhancing the fluid communication between the two sub-chambers.

5. The cooling apparatus according to claim 1 wherein the chamber fluid is circulated as a result of heat from the motor causing the chamber fluid in one of the sub-chambers to rise and flow through one of the communication openings into the other sub-chamber, where it falls due to cooling and reenters said one of the annular sub-chambers.

6. The cooling apparatus according to claim 1 further comprising vanes extending from an exterior surface of the shroud for enhancing heat transfer through the shroud.

7. The cooling apparatus according to claim 1 further comprising vanes extending from an interior surface of the shroud for increasing the heat transfer surface area.

8. A submersible downhole turbine machine assembly comprising:

a submersible downhole turbine machine;

a submersible electric motor mounted to the turbine machine and having a motor housing;

a shroud concentrically disposed around the motor housing of the motor, the shroud having a lower end extending below a lower end of the motor housing, the shroud being sealed from well fluids in the well, and defining an annular chamber between the motor housing and the shroud;

a cylindrical baffle that partitions the annular chamber into two concentric annular sub-chambers;

an upper communication opening located at an upper end of the baffle and a lower communication opening located at a lower end of the baffle such that the two sub-chambers are in fluid communication with each other;

a chamber fluid located in the chamber, wherein heat from the motor causes circulation of the chamber fluid between the two annular sub-chambers through the upper and lower communication openings to facilitate the transfer of heat between the motor and the well fluids;

the chamber fluid being isolated from communication with an exterior of the shroud; and a bellows mounted to the shroud, the bellows having one side exposed to the cooling fluid and another side to the well fluid and being movable for equalizing pressures inside to that outside the shroud.

9. The assembly according to claim 8 further comprising a flow inducer mounted to a lower end of the motor and rotated by the motor to enhance circulation of the chamber fluid.

10. The assembly according to claim 8 further comprising vanes extending from an exterior surface of the shroud for enhancing heat transfer through the shroud.

11. The assembly according to claim 8 further comprising:

a seal section between the motor and the turbine machine; and the shroud extending to an upper portion of the seal section.

12. A submersible downhole turbine machine assembly comprising:

a submersible downhole turbine machine;

a submersible electric motor mounted to the turbine machine and having a motor housing;

a shroud concentrically disposed around the motor housing of the motor, the shroud having a lower end extending below a lower end of the motor housing, the shroud being sealed from well fluids in the well, and defining an annular chamber between the motor housing and the shroud;

a cylindrical baffle that partitions the annular chamber into two concentric annular sub-chambers;

an upper communication opening located at an upper end of the baffle and a lower communication opening located at a lower end of the baffle such that the two sub-chambers are in fluid communication with each other;

a chamber fluid located in the chamber, wherein heat from the motor causes circulation of the chamber fluid between the two annular sub-chambers through the upper and lower communication openings to facilitate the transfer of heat between the motor and the well fluids;

a bellows mounted to the shroud, the bellows having one side exposed to the cooling fluid and another side to the well fluid and being movable for equalizing pressures inside to that outside the shroud;

a motor lead extending alongside an upper portion of the motor housing and entering the motor through a pot-head; and an upper end of the shroud being located above the pot-head and the lead extending through a sealed opening in the upper end of the shroud.

13. In a submersible downhole assembly having a submersible electric motor for driving a submersible downhole turbine machine for use in a well, the improvement comprising:

a shroud concentrically disposed about a motor housing of the motor, the shroud having a lower end below a lower end of a motor housing, the shroud having an upper end extending around an upper portion of the motor housing, the shroud being sealed from well fluid in the well, and defining an annular chamber between the motor housing and the shroud;

a longitudinal annular baffle extending substantially the length of the shroud that partitions the annular chamber into two concentric annular sub-chambers;

the sub-chambers having axially spaced apart communication openings such that the two sub-chambers are in fluid communication with each other;

a chamber fluid located in the chamber for circulating between the two sub-chambers through the communication openings to facilitate the transfer of heat between the motor and an exterior of the shroud;

the chamber fluid being isolated from communication with an exterior of the shroud;

a flow inducer mounted within the chamber and rotatably driven by the motor for enhancing the fluid communication between the two sub-chambers; and a bellows mounted to the shroud, the bellows having one side exposed to the chamber fluid and another side to the well fluid and being movable for equalizing pressures inside to that outside the shroud.

14. The assembly according to claim 13 wherein vanes extend from an exterior surface of the shroud for enhancing heat transfer through the shroud.

15. The assembly according to claim 13 further comprising:

a seal section between the motor and the turbine machine; and the shroud extending to an upper portion of the seal section.

16. In a submersible downhole assembly having a submersible electric motor for driving a submersible downhole turbine machine for use in a well, the improvement comprising:

a shroud concentrically disposed about a motor housing of the motor, the shroud having a lower end below a lower end of a motor housing, the shroud having an upper end extending around an upper portion of the motor housing, the shroud being sealed from well fluid in the well, and defining an annular chamber between the motor housing and the shroud;

a longitudinal annular baffle extending substantially the length of the shroud that partitions the annular chamber into two concentric annular sub-chambers;

the sub-chambers having axially spaced apart communication openings such that the two sub-chambers are in fluid communication with each other;

a chamber fluid located in the chamber for circulating between the two sub-chambers through the communication openings to facilitate the transfer of heat between the motor and an exterior of the shroud;

a flow inducer mounted within the chamber and rotatably driven by the motor for enhancing the fluid communication between the two sub-chambers;

a bellows mounted to the shroud, the bellows having one side exposed to the chamber fluid and another side to the well fluid and being movable for equalizing pressures inside to that outside the shroud;

a motor lead extending alongside an upper portion of the motor housing and entering the motor through a pot-head; and the upper end of the shroud being located above the pot-head and the lead extending through a sealed opening in the upper end of the shroud.

17. A method of cooling and protecting a submersible electric motor used in a well, the method comprising the steps of:

providing a shroud concentrically disposed about a motor housing of the motor;

sealing the shroud from well fluids in the well to define an annular chamber between the motor housing and the shroud;

isolating a chamber fluid located within the shroud from communication with an exterior of the shroud;

partitioning the annular chamber into two concentric annular sub-chambers;

allowing fluid communication between the sub-chambers by providing axially spaced apart communication openings between the sub-chambers; then causing the chamber fluid located in the chamber to circulate between the two sub-chambers through the communication openings to facilitate the transfer of heat between the motor and the well fluids.

18. The method according to claim 17 further comprising the step of equalizing pressures inside to that outside the shroud.

19. The method according to claim 17 further comprising the step of mechanically inducing flow between the two sub-chambers.

\* \* \* \* \*